United States Patent
Hebsgaard et al.

(10) Patent No.: US 7,035,251 B2
(45) Date of Patent: Apr. 25, 2006

(54) METHOD AND APPARATUS FOR THE SYNCHRONIZATION OF MULTIPLE CABLE MODEM TERMINATION SYSTEM DEVICES

(75) Inventors: Anders Hebsgaard, Duluth, GA (US); David R. Dworkin, Alpharetta, GA (US); Lisa V. Denney, Woodstock, GA (US); Robert J. Lee, Lawrenceville, GA (US); Thomas J. Quigley, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 55 days.

(21) Appl. No.: 10/856,829

(22) Filed: Jun. 1, 2004

(65) Prior Publication Data
US 2004/0218589 A1 Nov. 4, 2004

Related U.S. Application Data (63) Continuation of application No. 09/653,155, filed on Aug. 31, 2000, now Pat. No. 6,760,316, which is a continuation-in-part of application No. 09/574,558, filed on May 19, 2000, now Pat. No. 6,650,624, which is a continuation of application No. 09/430,821, filed on Oct. 29, 1999, now abandoned.

(60) Provisional application No. 60/151,661, filed on Aug. 31, 1999, provisional application No. 60/106,264, filed on Oct. 30, 1998, provisional application No. 60/106,427, filed on Oct. 30, 1998, provisional application No. 10/106,438, filed on Oct. 30, 1998, provisional application No. 60/106,439, filed on Oct. 30, 1998, provisional application No. 60/106,440, filed on Oct. 30, 1998, provisional application No. 60/106,441, filed on Oct. 30, 1998.

(51) Int. Cl.
*H04L 12/66* (2006.01)
(52) U.S. Cl. ............... 370/352; 370/432; 370/493; 375/222

(58) Field of Classification Search ............... 370/324, 370/480, 486, 490, 503, 509, 512, 270, 419, 370/420, 510, 489, 352, 432, 493; 375/222; 725/111
See application file for complete search history.

(56) References Cited

U.S. PATENT DOCUMENTS
5,790,806 A 8/1998 Koperda
(Continued)

FOREIGN PATENT DOCUMENTS
EP 0 727 883 A2 8/1996

OTHER PUBLICATIONS
Copy of International Search Report for International Appl. No. PCT/US00/23928, filed Aug. 31, 2000.
U.S. Appl. No. 09/652,718, filed Aug. 31, 2000, Denney et al.

*Primary Examiner*—Chi Pham
*Assistant Examiner*—Alexander O. Boakye
(74) *Attorney, Agent, or Firm*—Sterne, Kessler, Goldstein & Fox P.L.L.C.

(57) ABSTRACT

A plurality of CMTS devices are linked together and synchronized to facilitate communication between the respective CMTS devices and respective downstream cable modems. According to one embodiment of the invention, one of the CMTS devices is designated as a master device, and the other CMTS devices are designated as slave devices. The respective CMTS devices are connected to each other by means of a synchronization bus. The master CMTS device then generates and broadcasts a future time stamp value, which is received by the respective slave CMTS devices. When the time stamp counter in the master CMTS device reaches the transmitted value, a control signal is broadcast over the synchronization bus. The slave CMTS devices then retrieve the time stamp value and reset their respective local time stamp counters to the received value. In this manner, the CMTS devices are synchronized.

22 Claims, 8 Drawing Sheets

U.S. PATENT DOCUMENTS

| | | |
|---|---|---|
| 5,912,895 A | 6/1999 | Terry et al. |
| 6,349,138 B1 * | 2/2002 | Doshi et al. ................. 380/200 |
| 6,510,162 B1 | 1/2003 | Fijiolek et al. |
| 6,526,070 B1 | 2/2003 | Bernath et al. |
| 6,583,825 B1 * | 6/2003 | Yuen et al. .................. 348/731 |
| 6,760,316 B1 * | 7/2004 | Hebsgaard et al. ......... 370/324 |

* cited by examiner

METHOD AND APPARATUS FOR THE SYNCHRONIZATION OF MULTIPLE CABLE MODEM TERMINATION SYSTEM DEVICES

CROSS-REFERENCE TO RELATED APPLICATIONS

This application is a continuation of U.S. application Ser. No. 09/653,155 filed Aug. 31, 2000, now U.S. Pat. No. 6,760,316, which claims the benefit of the filing date of U.S. provisional Application No. 60/151,661 filed Aug. 31, 1999, and is also a Continuation-In-Part of U.S. regular application Ser. No. 09/574,558, filed on May 19, 2000, now U.S. Pat. No. 6,650,624, issued Nov. 18, 2003 which is a Continuation of U.S. regular application Ser. No. 09/430,821, filed on Oct. 29, 1999 now abandoned, which claimed the benefit of the filing date of U.S. Provisional Patent Application No. 60/106,264, filed Oct. 30, 1998 and entitled HEADEND UPSTREAM MAC/PHY INTERFACE; U.S. Provisional Patent Application No. 60/106,427, filed Oct. 30, 1998 and entitled ROBUST TECHNIQUE FOR OPTIMAL UPSTREAM COMMUNICATION BETWEEN CABLE MODEM SUBSCRIBER AND A HEADEND); U.S. Provisional Patent Application No. 60/106,438, filed Oct. 30, 1998 and entitled SYSTEM FOR, AND METHOD OF, FRAGMENTING DATA PACKETS IN A CABLE MODEM SYSTEM; U.S. Provisional Patent Application No. 60/106,439, filed Oct. 30, 1998 and entitled CABLE MODEM SYSTEM; U.S. Provisional Patent Application No. 60/106,440, filed Oct. 30, 1998 and entitled NETWORK DATA TRANSMISSION SYNCHRONIZATION SYSTEM AND METHOD; U.S. Provisional Patent Application No. 60/106,441, filed Oct. 30, 1998 and entitled BURST RECEIVER SYSTEM, the entire contents of all of which are hereby expressly incorporated by reference.

FIELD OF THE INVENTION

The present invention relates generally to communication systems. The present invention more particularly relates to a cable modem system wherein information is communicated between a plurality of cable modems and a cable modem termination system that includes a plurality of cable modem termination system devices.

BACKGROUND OF THE INVENTION

The desired solution for high speed data communications appears to be cable modem. Cable modem is capable of providing high data throughput rates, and is thus suitable for high speed file transfer, video teleconferencing and pay-per-view television. Further, cable modems may simultaneously provide high speed Internet access, digital television (such as pay-per-view) and digital telephony.

Although cable modems are used in a shared access system, wherein a plurality of subscribers compete for bandwidth over a common coaxial cable, any undesirable reduction in actual data rate is easily controlled simply by limiting the number of shared users on each system. In this manner, each user is assured of a sufficient data rate to provide uninterrupted video teleconferencing or pay-per-view television, for example.

Cable modem systems typically include one or more head ends or cable modem termination system (CMTS) devices that engage in bidirectional communication with the various subscribers' cable modems. Both the cable modems and the CMTS devices include modulators to transmit data (either upstream from the cable modems to the CMTS devices, or downstream from the CMTS devices to the cable modems), as well as demodulators to receive and demodulate the incoming data. Such system are preferably flexible to accommodate varying numbers of subscribers (typically an ever-increasing number).

MAP information is transmitted on one or more downstream channels by the cable modem termination system to all of the cable modems on a given frequency channel. As is well known in the art, MAP information covers all time periods on an upstream channel. MAP information typically consists of the combination of one or more of the following: request regions (i.e., the contention area that a modem can request new band width), request/data regions (where both data and request can be transmitted), initial maintenance regions (where new modems have the right to try and sign on), station maintenance regions (for modems that are in operation), and short and long data grant regions (for transmitting data). The short and long data grants may either be based on a request or can also be unsolicited grants. The MAP will consist of a combination of these regions, all as decided by the MAP generator.

SUMMARY OF THE INVENTION

The present invention specifically addresses and alleviates certain deficiencies associated with the above-mentioned prior art.

According to an aspect of the invention, a plurality of CMTS devices are linked together to form a larger medium access control (MAC) domain. The CMTS devices are preferably synchronized to facilitate communication between the CMTS devices and the cable modems.

In another embodiment of the invention, MAP information is transmitted to one or more of the CMTS devices, with such MAP information then being passed on to the downstream cable modems. The MAP information is then transmitted to the rest of the CMTS devices of the system. Each of the upstream channels is uniquely identified so that each of the CMTS devices extracts only the relevant MAP information from the broadcasted information.

Thus, in one illustrative embodiment of the invention, a plurality of CMTS devices are linked together and synchronized to facilitate communication between the respective CMTS devices and the downstream cable modems. According to the invention, one of the CMTS devices is designated as a master device, and the other CMTS devices are designated as slave devices. The respective CMTS devices are connected to each other by means of a synchronization bus. A future time stamp value is generated based on the counter value of the master CMTS device, and the future time stamp value is broadcast over the bus and is received by the respective CMTS devices. When the time stamp counter in the master CMTS device reaches the generated future time stamp value, a control signal from the master CMTS device is broadcast over the synchronization bus. The slave CMTS devices then retrieve the future time stamp value and reset their respective local time stamp counters to the future time stamp value. In this manner, the CMTS devices are synchronized.

In another illustrative embodiment, MAP information is generated and transmitted to at least one CMTS device, which forwards it on to the cable modems. The MAP information is then transmitted to the other CMTS devices. Each CMTS device receives the MAP information and filters out the information that is irrelevant to that particular CMTS device. Each CMTS device determines the relevant information based on unique identifiers assigned to the respective upstream channels, which are included in the MAP information.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
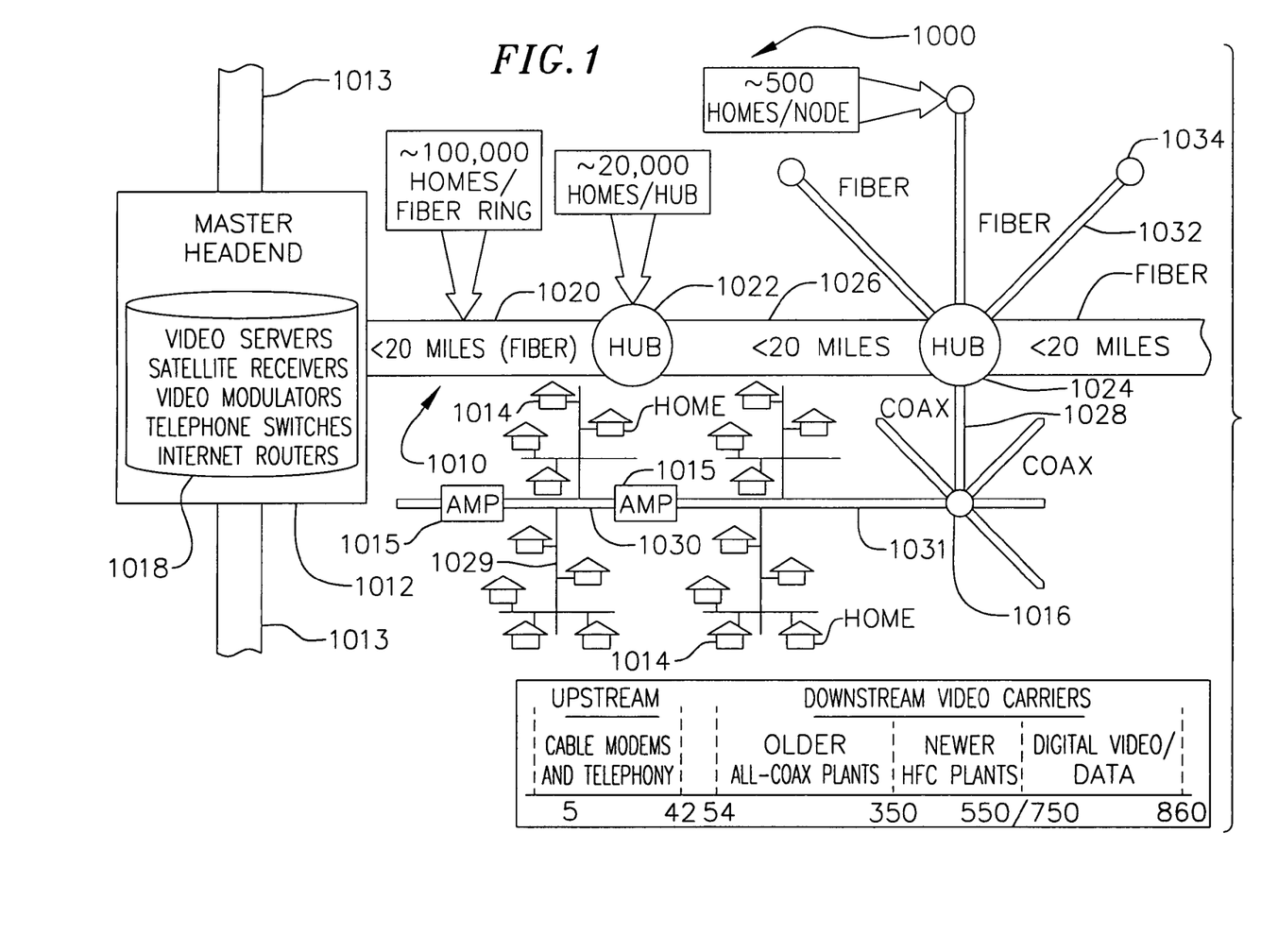
FIG. 1 is a schematic diagram of a hybrid fiber coaxial (HFC) network showing typical pathways for data transmission between a headend (which contains the cable modem termination system) and a plurality of homes (each of which contains a cable modem)
Figure 2:
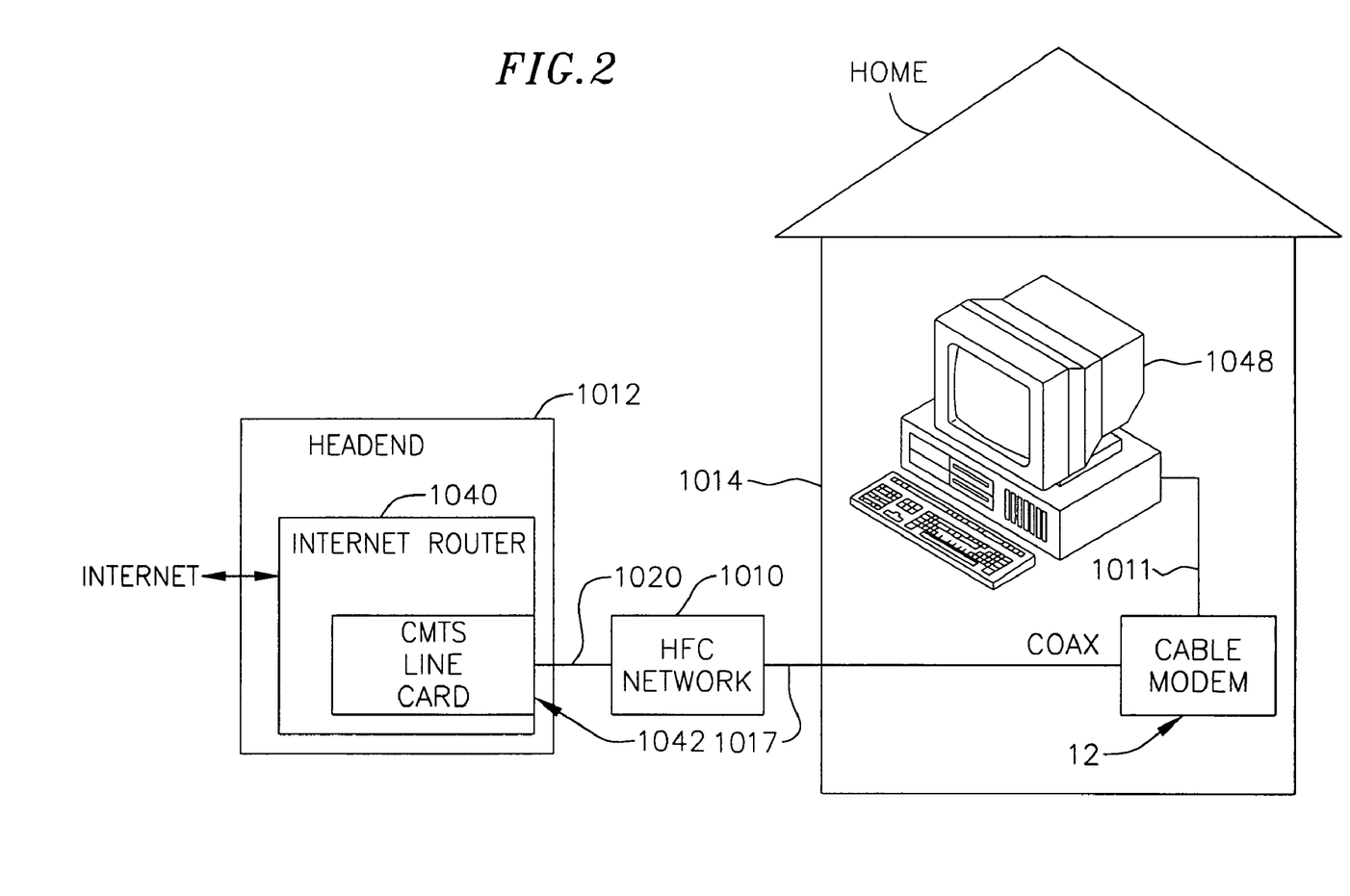
FIG. 2 is a simplified block diagram of a cable modem system wherein a line card which defines a cable modem termination system (CMTS) is disposed at the headend and a cable modem is disposed within a representative home.

Referring now to FIGS. 1 and 2, an overall cable modem system 1000, such as the one disclosed in pending U.S. regular application Ser. No. 09/574,558, filed on May 19, 2000, and hereby expressly incorporated by reference, is shown in detail. Briefly, the system 1000 includes one or more headends 1012 including respective cable modem termination systems (CMTS) 1042 (FIG. 2) that are located at a cable company facility and that function as modems to service a large number of subscribers. Each subscriber has a cable modem (CM) 12. Thus, the cable modem termination systems 1042 are capable of facilitating bidirectional communication with any desired one of the plurality of cable modems 12.

As used herein, the cable modem termination system (CMTS) 1042 is defined to include that portion of a headend which facilitates communication with a plurality of cable modems 12. A typical cable modem termination system includes one or more burst receivers, a continuous transmitters, and medium access controls (MAC).

In one embodiment, the cable modem termination system 1042 communicates with the plurality of cable modems 12 via a hybrid fiber coaxial (HFC) network 1010, wherein optical fiber 1020 provides communication to a plurality of fiber nodes or hubs 1022, and each fiber node typically serves approximately 500 to 2,000 subscribers. The subscribers communicate with the fiber node via a common (or shared) coaxial cable 1028. It is this sharing of the common coaxial cable which necessitates that the number of cable modems 12 attached thereto be limited so as to mitigate the likelihood of undesirable bit rate reductions which inherently occur when an excessive number of cable modems 12 communicate simultaneously over a single coaxial cable 1028.

The hybrid fiber coaxial network 1010 of a cable modem system 1000 utilizes a point-to-multipoint topology to facilitate communication between each cable modem termination system 1042 and the corresponding cable modems 12. Frequency domain multiple access (FDMA) is preferably used to facilitate communication from the cable modem termination system 1042 to each of the cable modems 12, i.e., in the downstream direction. Frequency domain multiple access (FDMA)/time domain multiple access (TDMA) is preferably used to facilitate communication from each cable modem 12 to the cable modem termination system 1042, i.e., in the upstream direction.

Each cable modem termination system (CMTS) 1042 includes at least one downstream modulator for facilitating the transmission of data communications from the CMTS 1042 to the cable modems 12. In addition, each CMTS 1042 includes at least one upstream demodulator for facilitating the reception of data communications from the respective cable modems 12. The downstream modulator(s) preferably utilize a data transmission protocol that provides a relatively high throughput rate, while the upstream demodulators may utilize a data transmission protocol that provides a lower throughput rate.

Similarly, each cable modem 12 includes an upstream modulator for facilitating the transmission of data to the corresponding cable modem termination system 1042 and a downstream demodulator for receiving data from the cable modem termination system 1042.

Contemporary cable modem systems operate on a plurality of upstream channels and preferably utilize time division multiple access (TDMA) in order to facilitate communication between a plurality of cable modems 12 and a single cable modem termination system 1042 on each upstream channel. Typically, between 250 and 500 cable modems communicate with a single cable modem termination system on a given upstream channel.

In order to accomplish TDMA for upstream communication, it is necessary to assign time slots within which the respective cable modems 12 are allowed to transmit. Assignment of those time slots results in the generation of MAP information, as described above. The MAP information is forwarded on to the cable modems 12, which are controlled by that MAP information, as is described in more detail below.

Figure 3:
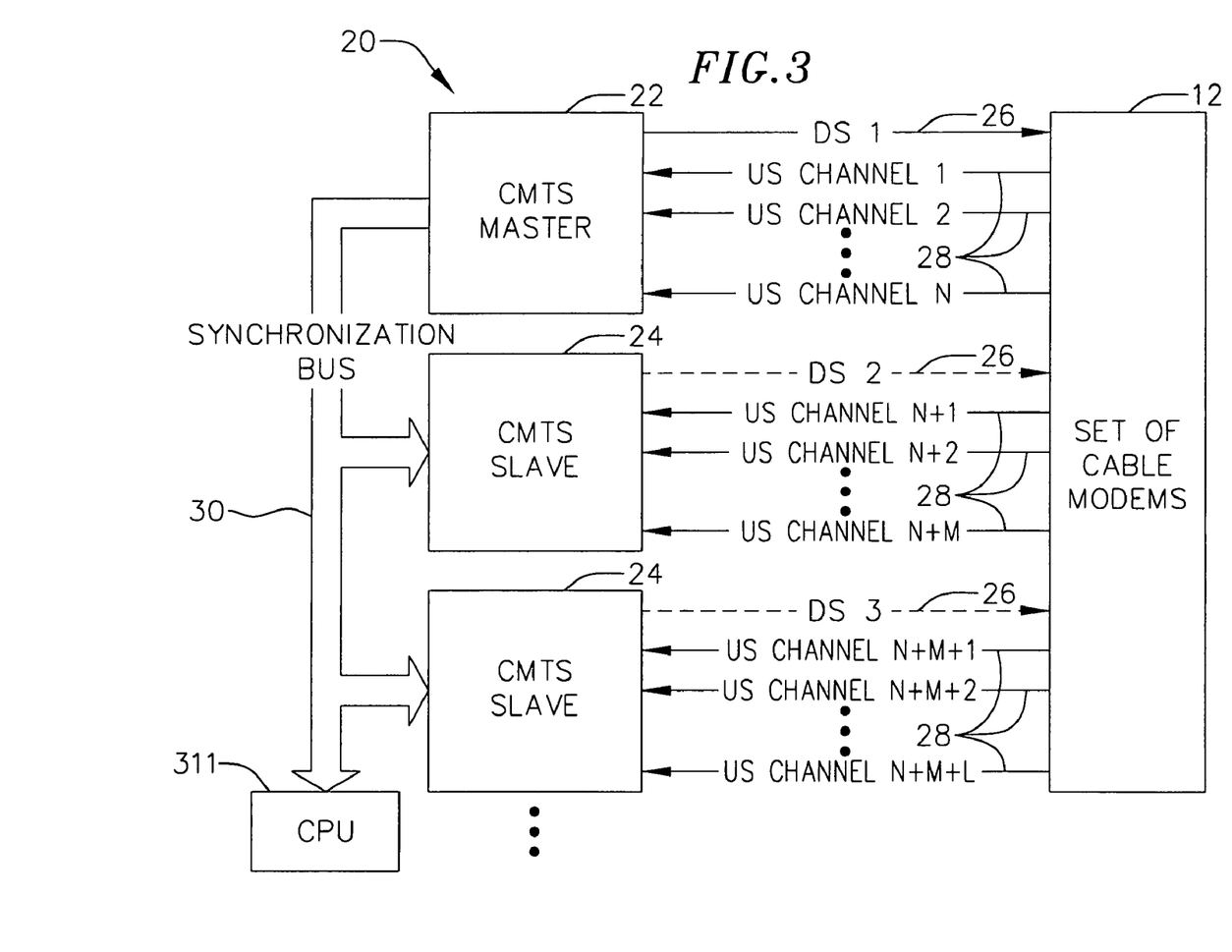
FIG. 3 is a schematic diagram of a system incorporating multiple CMTS devices according to one illustrative embodiment of the invention.

Referring now to FIG. 3, a system 20 depicting one illustrative embodiment of the invention is shown. System 20 provides a modular system that can accommodate the diverse needs of cable operators in different geographic regions. System 20 includes a plurality of CMTS devices, including one master CMTS device 22 and one or more slave CMTS devices 24. It will be understood that the number of slave CMTS devices 24 will vary depending on the requirements of a particular geographic region. Moreover, as the requirements for a particular region change (e.g., as the number of subscribers grows in a particular region), additional slave CMTS devices 24 may be incorporated into the system 20. Thus, system 20 is readily expandable.

The master CMTS device 22 includes a downstream channel 26 to transmit data to the downstream cable modems 12 being serviced by the master device 22. In addition, each CMTS device 22 and 24 includes at least one upstream channel 28, and preferably plural such channels, to receive data transmitted by the respective cable modems.

One or more of the slave CMTS devices 24 may also include a downstream channel 26 (shown in dashed lines in FIG. 3).

The master CMTS device 22 is connected to each of the slave CMTS devices 24 by means of a synchronization bus 30. As is described in greater detail below, master CMTS device 22 is programmed to broadcast certain information over bus 30 for receipt by the respective slave CMTS devices 24 to control the respective slave CMTS devices. In addition, time stamp information for synchronizing the CMTS devices 22 and 24 is broadcast over bus 30 for receipt by all of the CMTS devices 22 and 24.

As used herein, the term "synchronization bus" is intended to refer to any path to allow the transmission of data, for example, a peripheral component interface ("PCI"), back-plane bus, four-wire interface, coaxial cable, or even a wireless path. Thus, the term "synchronization bus" is not intended to refer to any particular type of path; rather, it is used herein to refer to any suitable path for the transmission of the below-described data.

Figure 4:
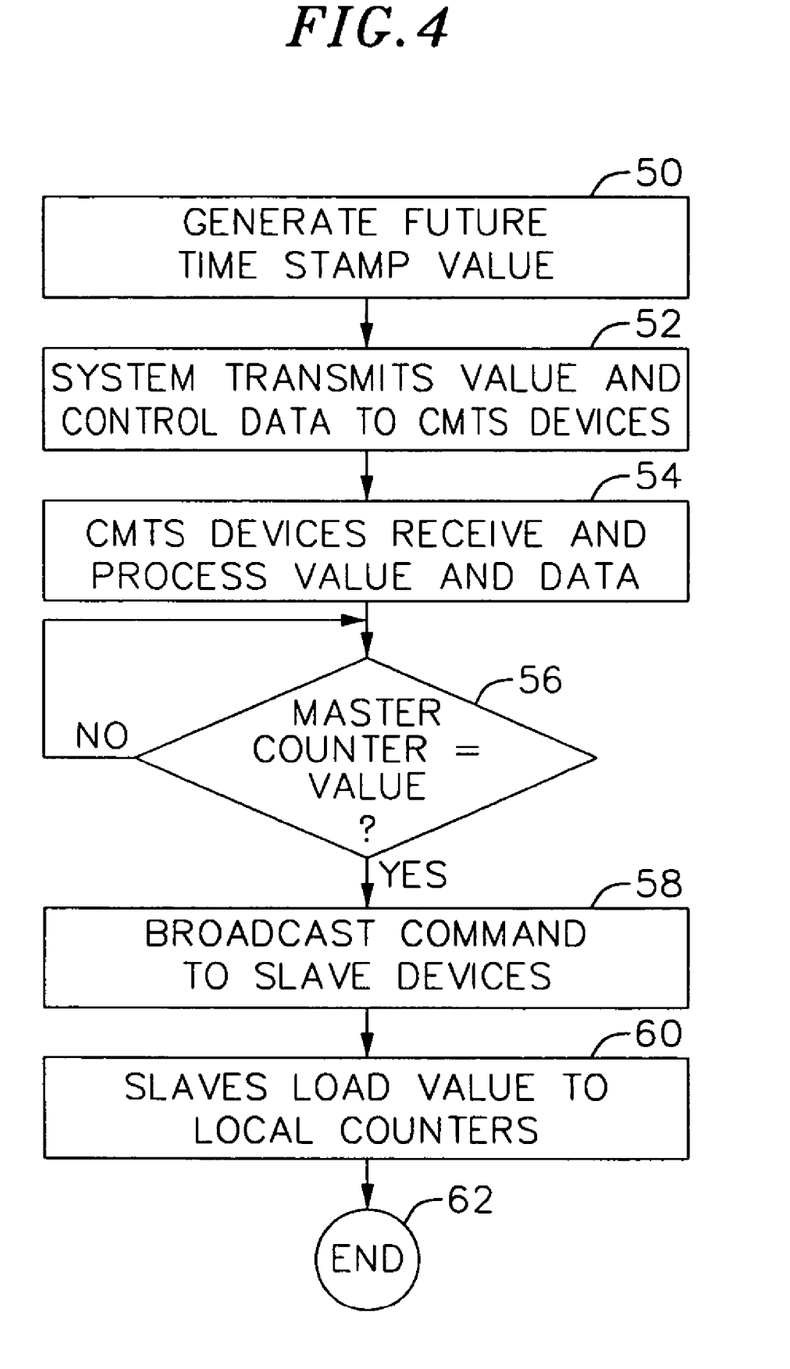
FIG. 4 is a flow chart depicting the operational flow of one illustrative embodiment of the system of FIG. 3.

Referring now to FIG. 4, the operational flow of system 20 in carrying out a synchronization routine is described in more detail. Operation begins at step 50, with system 20 generating a future time stamp value. In one embodiment, system 20 polls the master CMTS device 22 for its current counter value, and generates a future time stamp value based on that current counter value. The future time stamp value is a value that will be used to synchronize the counter of each CMTS device 22 and 24. At step 52, system 20 broadcasts the future time stamp value over bus 30, along with appropriate control data for receipt by the respective devices 22 and 24. Preferably, the future time stamp value is a 32-bit data word, and the control data precedes the data word and serves to identify the data as corresponding to a future time stamp value.

Then, operation proceeds to step 54, and the respective CMTS devices 22 and 24 receive the broadcasted data. CMTS devices 22 and 24 process the control data to determine that the data packet contains a future time stamp value, and the respective CMTS devices 22 and 24 then store the future time stamp value to an appropriate register. As is described in detail below, in one illustrative embodiment master CMTS device 22 stores the future value in a comparison register, while the slave devices 24 store the value in respective load registers.

In one embodiment, system 20 uses conventional software interrupts or polling mechanisms to detect missing time stamp transmissions at the respective CMTS devices 22 and 24. For example, software interrupts may operate to check the respective CMTS devices 22 and 24 to ensure that each transmission was received. In one embodiment, this is accomplished by a software interrupt that reads the value of the TGCVerify register 306 for each CMTS device 22 and 24.

At query block 56, master CMTS device 22 determines whether its internal time stamp counter has reached the value of the future time stamp. In one embodiment, device 22 compares the value of its time stamp counter with the future time stamp value stored in its comparison register. Operation remains at query block 56 until master CMTS device 22 determines that in fact its internal counter has reached the transmitted future time stamp value. Operation then proceeds to step 58, and master CMTS device 22 broadcasts a corresponding control signal over bus 30 to the respective slave CMTS devices 24. At step 60, the respective slave CMTS devices 24 receive the control signal and process same to determine that the stored time stamp value must be retrieved. Each slave CMTS device 24 then retrieves the time stamp value from its load register or other suitable location, and loads its counter with that value. Operation then terminates at step 62.

In this manner, the CMTS devices 22 and 24 are all synchronized to the same time stamp value, which provides system redundancy. If one of the CMTS devices 24 fails, one or more of the other devices 24 can assume the failed device's load and process requests from the cable modems 12 that were previously being serviced by the now-unavailable device 24. As is well known in the art, cable modem systems are very dependent on timing information. If two of the CMTS devices are slightly off in terms of timing, one CMTS device cannot assume the other CMTS device's load without causing the associated cable modems to be affected. Thus, by providing multiple, synchronized CMTS devices, the respective cable modems can be serviced by any of those devices. Thus, system 20 can engage in load balancing and can send commands to transfer the cable modems 12 between the respective downstream channels 26.

Preferably, the synchronization method of FIG. 4 is frequently repeated to continually ensure that the various CMTS devices 22 and 24 remain synchronized with one another. The frequency of performing the method depends on the precision of the reference oscillators used. In one illustrative embodiment, each of the CMTS devices 22 and 24 includes its own reference oscillator having a precision on the order of 50 parts per million ("PPM"), in which case a future time stamp value is transmitted on the order of once per millisecond. However, it will be apparent to those skilled in the art that the rate at which the synchronization process is performed will vary depending on many factors, including the system timebase quality. For example, if the reference oscillators are of very high quality, the synchronization process of FIG. 4 may be performed less frequently. In addition, in an alternative embodiment described in more detail below, the same timebase may be used for all slave devices and the master device, in which case the synchronization process may be repeated relatively infrequently, if at all.

According to another aspect of the invention, system 20 also controls the sharing of MAP information among the respective CMTS devices 22 and 24 of system 20. MAP information is generated by a component of system 20 (e.g., CPU 311), with time slots then being allocated to the respective cable modems, dictating when those cable modems may transmit messages over one of the upstream channels. That time slot information is then transmitted to the cable modems over the respective downstream channels.

According to one illustrative embodiment of the invention, a method is provided for sharing upstream MAP information amongst the respective CMTS devices 22 and 24. As described above, each CMTS device 22 and 24 is connected to at least one upstream channel 28. Each of these channels is assigned a unique identifier that is recognized by the component assigning the time slots, as well as by the respective CMTS devices 22 and 24.

Figure 5:
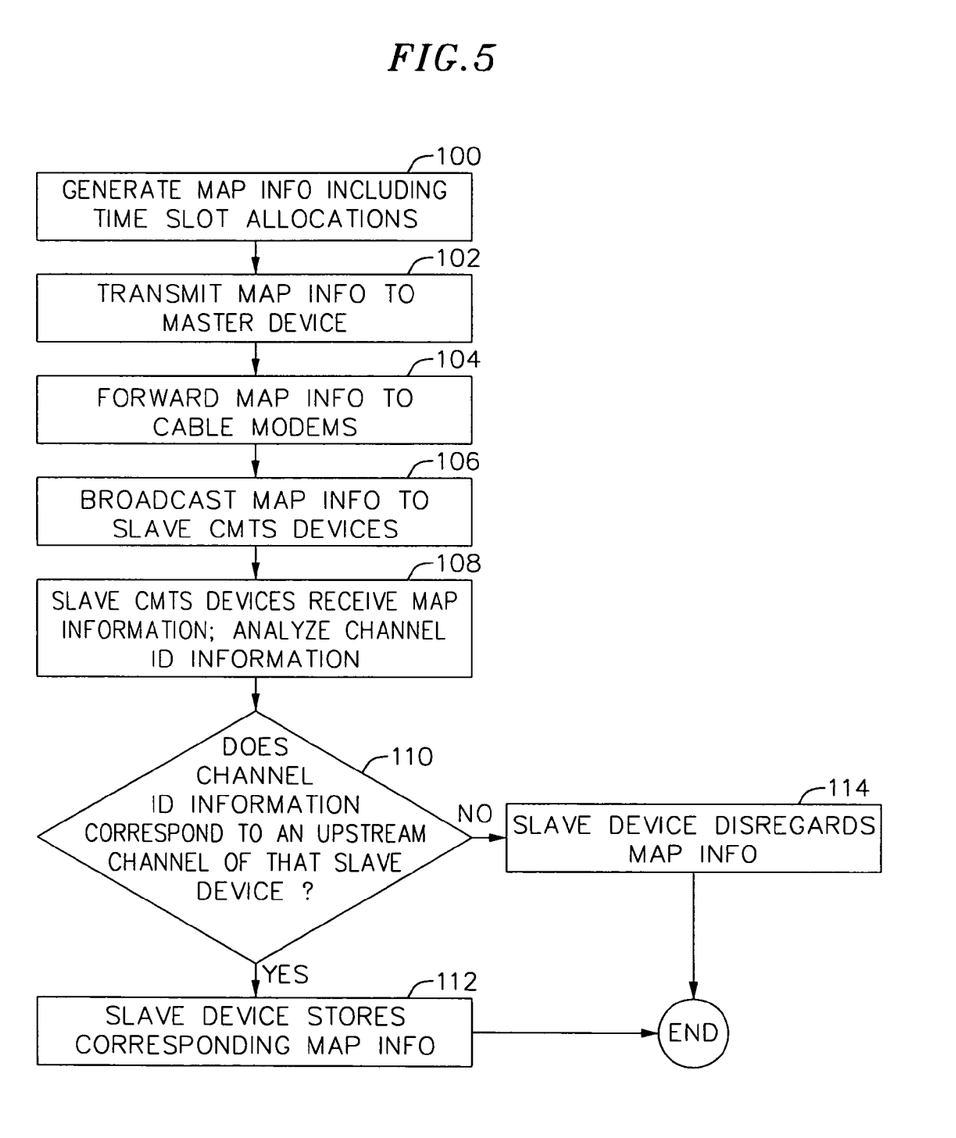
FIG. 5 is a flow chart depicting the operational flow of another illustrative embodiment of the invention.

Operation of the MAP sharing method begins at step 100, with system 20 assigning time slots for each upstream channel 28, and generating corresponding MAP information, along with channel identification information for each time slot. For example, time slot number one on upstream channel number one may be assigned to cable modem X, while time slot two on channel number one is assigned to cable modem Y. In addition, time slot number one on upstream channel number two is assigned to cable modem Z, while time slot number two on channel number two is assigned to cable modem W. Thus, each discrete time slot assignment preferably is a data block that includes information to identify 1) the time slot, 2) the upstream channel, and 3) the cable modem. In one illustrative embodiment, such functionality is carried out by CPU 311.

At step 102, the MAP information is transmitted to the master CMTS device 22, preferably over bus 30. Master CMTS device 22 then forwards the MAP information on to the respective cable modems 12 over downstream channel 26, at step 104. The cable modems receive the time slot information and store the relevant time slot information in a register until the appropriate time, at which time the cable modems are allowed to transmit information to the CMTS device over the respective upstream channels 28. At step 106, master CMTS device 22 broadcasts the MAP information to the slave CMTS devices 24.

At step 108, the respective slave CMTS devices 24 receive the MAP information and analyze the channel identification information for the respective assignments. At query block 110, each CMTS device determines whether the channel identification information matches with one of the channels connected to that CMTS device. If so, then operation proceeds to step 112, and the corresponding assignment is stored by that CMTS device.

On the other hand, if the channel identification information does not match with one of the channels connected to a particular CMTS device, then operation proceeds to step 114 and that MAP information is ignored by that particular CMTS device. In that manner, each slave CMTS device 24 only stores the MAP information relevant to it. The irrelevant information is discarded.

Alternatively, the MAP information may be simultaneously broadcast to each of the CMTS devices 22 and 24, with master device 22 forwarding the MAP information on to the cable modems 12, and each CMTS device 22 and 24 then filtering the MAP information and storing the relevant information for the respective CMTS device. In yet another embodiment, the MAP information may be transmitted to each CMTS device 22 and 24 that has an associated downstream channel 26, so that the MAP information can be transmitted to all of the cable modems 12. One of those CMTS devices (for example, the master device 22) then broadcasts the MAP information to the other slave devices 24, and the filtering step is then carried out.

As described above, a number of different control bits are transmitted over bus 30 by master CMTS device 22 and by other components of system 20, along with the MAP information and future time stamp value information. The control data includes data to indicate the type of data being transmitted (either MAP or time stamp value information), control data to alert the slave CMTS devices 24 that a time stamp value is then valid, and end-of-package (EOP) control data to indicate the end of a block of MAP information.

It will be understood by those skilled in the art that the future time stamp value must be transmitted some amount of time before the master device's internal counter reaches the time stamp value. In one illustrative embodiment, the future time stamp value is transmitted between about 8 and about 64 synchronization clock cycles prior to reaching the future value, so as to ensure that the slave devices 24 receive the time stamp value in a timely manner.

In one embodiment described above, each of the master and slave CMTS devices 22 and 24 includes its own reference oscillator. Depending on the precision of those oscillators, the synchronization process will have to be repeated more or less often. For example, in the case of oscillators with a precision of 50 PPM, it is desirable to repeat the process once per millisecond.

Alternatively, the respective CMTS devices 22 and 24 can be driven from a single reference oscillator, in which case the respective counters in each CMTS device need not be updated as frequently, if at all. This allows for setting the counter value once, with only periodic checks being done to ensure that the slave devices 24 remain synchronized with the master device 22. In this alternate embodiment, because each of the master and slave devices 22 and 24 are run from the same oscillator, it is presumed that the respective devices 22 and 24 remain in synchronization with each other for relatively long periods of time. Thus, the initial synchronization process is identical to that described above in connection with FIG. 4. However, the synchronization process shown in FIG. 4 need not be frequently repeated. Rather, CPU 311 is preferably programmed to periodically read the value in TGCVerify register 306 from one or more of the slave devices 24 and to compare that value with the value in register 306 of master device 22. If the two values are not identical, then the process of FIG. 4 may be repeated to regain synchronization.

Figure 6:
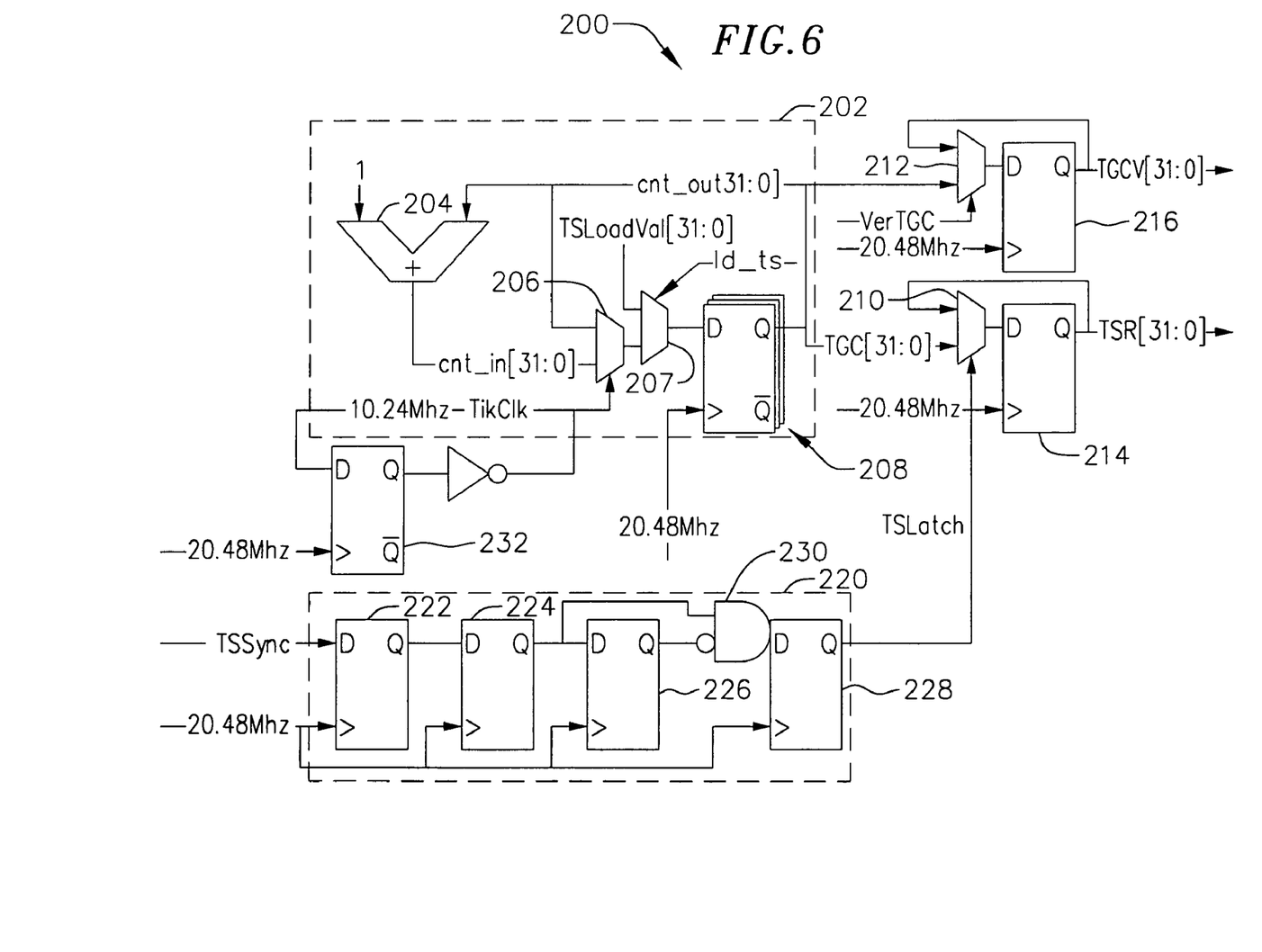
FIG. 6 is a schematic diagram of one illustrative embodiment of a circuit used for time-stamp generation and time stamp synchronization according to the present invention.
Figure 7:
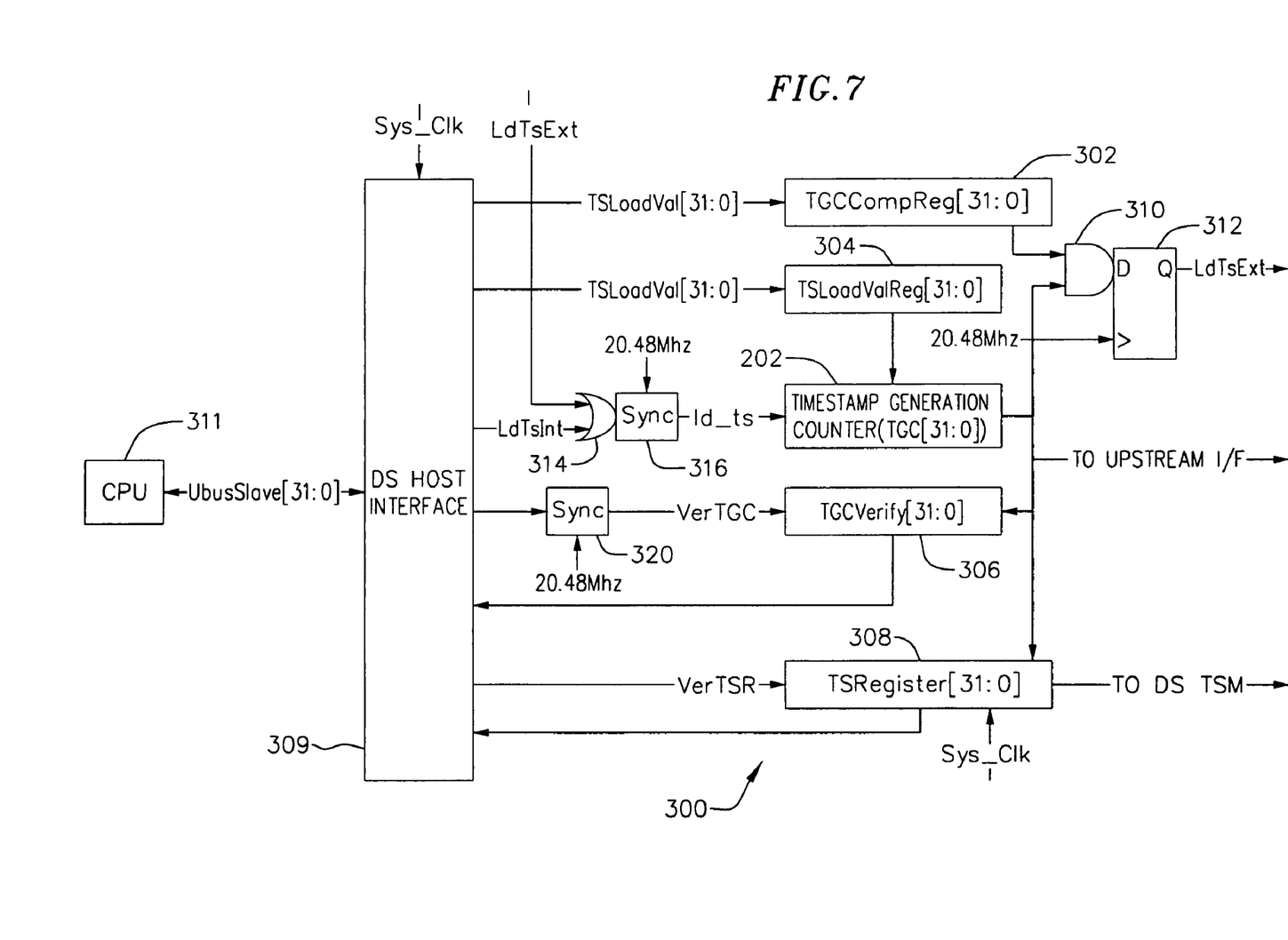
FIG. 7 is a block diagram of a CMTS device circuit incorporating the circuit shown in FIG. 6.

Referring now to FIG. 6, there is shown a schematic of a circuit 200 that may be incorporated into each CMTS device 22 and 24 for performing the time-stamp generation and time-stamp synchronization functions. The circuit 200 includes a counter 202 including an accumulator 204, a pair of multiplexers (MUX) 206 and 207, and thirty two D-type flip flops 208 (shown schematically) to process the individual bits of a 32-bit time stamp. The accumulator 204 increments the output of the flip flops 208 (i.e., the time stamp value of the counter 202), and introduces the incremented value to MUX 206, which also receives the time stamp value from flip flops 208 directly. MUX 206 is designed to select the output from flips flops 208 until it is triggered by a rising edge of TikClk introduced to MUX 206, in which case the signal from accumulator 204 is selected. The output of MUX 206 is introduced to MUX 207, along with a TSLoadVal signal from a TSLoadVal Register 304 (FIG. 7). MUX 207 is designed to select the output from MUX 206 until it receives a ld_ts signal pulse, in which case MUX 207 is designed to select the TSLoadVal signal and to output same. The output of MUX 207 is introduced to the D inputs of the respective 32 flip flops 208 (one bit per flip flop), which serve to update the value of the local counter upon the next rising edge of the clock input.

The output of the counter 202 is introduced to a pair of multiplexers 210 and 212. The output of each MUX 210 and 212 is introduced to the D inputs of respective D-type flip flops 214 and 216, and the Q outputs of each flip flop 214 and 216 define, respectively, TSRegister (TSR) and TGCVerify (TGCV) signals, which are fed back to the respective MUXs 210 and 212. Thus, each MUX 210 and 212 is designed to select the output from the corresponding flip flop 214 and 216 (i.e., the output of each flip flop remains static) until the MUXs receive respective trigger signal VerTGC and TSLatch, as is described in more detail below. When either MUX 210 or 212 receives the corresponding trigger signal, the current counter value TGC (i.e., the output of flip flops 208) is selected by that MUX, and is passed on through the corresponding flip flop as output signal TGCV or TSR.

Circuit 200 also includes a synchronizer 220 consisting of a plurality of D-type flip flops 222, 224, 226, and 228 arranged in series. Each flip flop preferably receives the 20.48 MHz clock. The first flip flop 222 receives a TSSync pulse at its D input, and has its Q output coupled to the D input of flip flop 224. The Q output of flip flop 224 is coupled to the D input of flip flop 226, and is also coupled to one input of an AND gate 230. The output of flip flop 226 is coupled to an inverted input of AND gate 230. Thus, when the Q output from flip flop 224 goes high, the output of AND gate 230 goes high, which triggers flip flop 228 to generate the TSLatch pulse at its Q output, which is introduced to MUX 210.

Thus, the synchronizer 220 may be used to perform a synchronization technique in which a register may be loaded by logic that uses one clock domain (e.g., 20.48 MHz), and the register may then be read by logic that uses a different clock domain (e.g., 100 MHz). This allows for moving the counter time stamp value from the 20.48 MHz time domain of the circuit 200 into the 100 MHz time domain of the overall system clock. The synchronizer 220 receives the TSSync pulse that is generated on the system clock (e.g., 100 MHz), and outputs the TSLatch pulse that is on the TGC time base (e.g., 20.48 MHz). The TSSync pulse preferably has a width greater than one clock cycle of the TGC time base. The TSSync pulse is synchronized by the synchronizer 220, which is driven by the TGC clock (e.g., 20.48 MHz). Thus, the TSSync pulse is generated by the timebase which drives the logic that will read the contents of the register.

Preferably, the TSSync pulse is generated a predetermined amount of time prior to the actual read of the contents of the register, and synchronized to provide a rising edge detection by logic driven by the same timebase which also drives the logic that loads the contents of the register.

Figure 8:
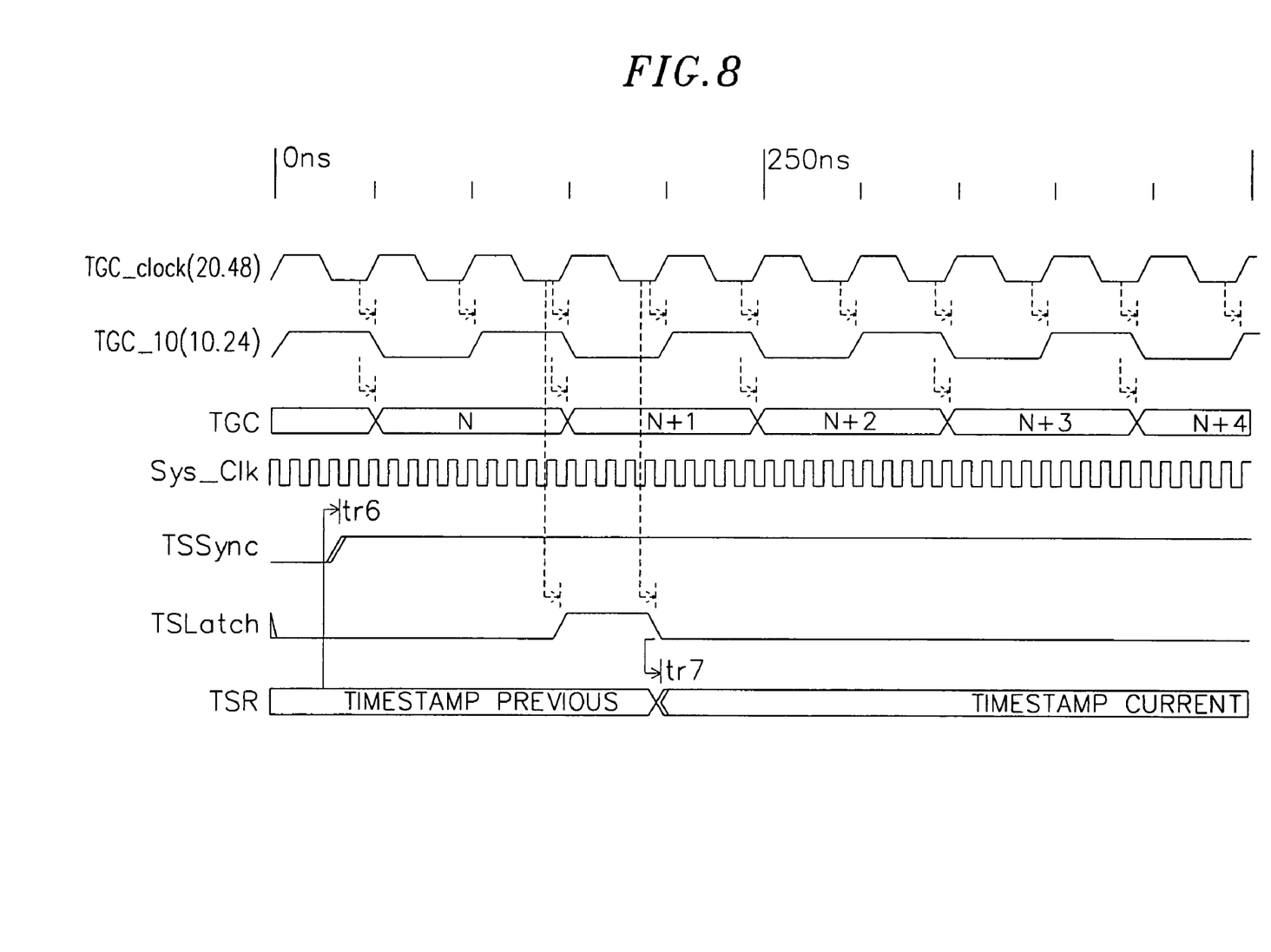
FIG. 8 is a timing diagram showing the relationships between various signals transmitted according to one illustrative embodiment of the invention.

Circuit 200 also includes D-type flip flop 232, which serves to divide the frequency of the 20.48 MHz clock by a factor of two, and supplies the inverted 10.24 MHZ TikClk signal to MUX 206. As shown in FIG. 8, the TikClk is ½ the 20.48 MHz reference oscillator and is centered ½ way between TGC transitions. This allows the rising edge of the 10.24 MHz TikClk signal to be exactly centered within the TGC value.

Referring now to FIG. 7, a circuit 300 is shown in block diagram form, which includes circuit 200 and additional components. Circuit 300 includes a comparison register TGCCompReg 302, a future time stamp register TSLoadValReg 304, the time stamp generation counter (TGC) 202, a verify register TGCVerify 306, and a time stamp register TSRegister 308. Circuit 300 communicates with the system 20 via a DS host interface 309. Circuit 300 may be used in either the master CMTS device 22, or in the slave CMTS devices 24, as is described in detail below.

TGCCompReg 302 serves to hold the future time stamp value for the master CMTS device 22, while TSLoadValReg 304 holds the future time stamp value for each slave CMTS device 24. Each register 302 and 304 receives a TSLoadVal signal from the component generating the future time stamp values, as is described in more detail below.

As described above, the TGC counters 202 serve to continually update the current time stamp value for the corresponding CMTS devices. In the master device 22, the continually incrementing output of the counter 202 is introduced to AND gate 310, along with the value in the TGCCompReg 302. When the value in register 302 matches the value in counter 202, a pulse is generated by AND gate 310 which is introduced to the D input of a D-type flip flop 312, whose Q output then generates a load signal LdTsExt, which is broadcast to each of the slave CMTS devices 24.

Each slave CMTS device 24 receives the LdTsExt signal at an OR gate 314, along with a register command LdTsInt, either of which causes the output of OR gate 314 to go high. The output from the OR gate is introduced to synchronizer 316, which generates the ld_ts signal at the next rising edge of the 20.48 MHz clock signal. The ld_ts signal is introduced to counter 202, which is thereby triggered to retrieve the future time stamp value from register 304 and to set the value of counter 202 to that value to thereby synchronize each slave CMTS device 24 with master CMTS device 22.

The value of counter 202 is also introduced to registers 306 and 308 in response to receipt of the TGCV and TSR signals from respective flip flops 210 and 212 (FIG. 6). The values in each register 306 and 308 can be verified by respective VerTGC and VerTSR signals received via DS host interface 309.

System 20 includes appropriate software for generating the future time stamp value, with such software controlling an appropriate component of system 20, such as CPU 311. In one embodiment, the CPU 311 is controlled by software to poll the counter 202 of master CMTS device 22 for the current time stamp value. Thus, an appropriate polling signal is transmitted and received by the host interface 309. The signal is passed to a synchronizer 320, which outputs VerTGC signal on the next rising edge of the 20.48 MHz clock. The VerTGC signal is received by MUX 212 (FIG. 6), which then passes the current time stamp value to TGCVerify register 306, which in turn passes the time stamp value to the CPU 311 through interface 309.

The software then controls CPU 311 to take the current time stamp value, add some predetermined number of cycles to that value to generate the future time stamp value, and to pass the signal on to the respective CMTS devices 22 and 24 as TSLoadVal, which is received by the respective registers 302 and 304. Then, as described above, when the value in register 302 equals the counter value, the LdTsExt pulse is generated by the master CMTS device 22. Each slave receives the pulse at OR gate 314, forwards the pulse as signal ld_ts to counter 202 of each slave device 24, which then takes the value in register 304 and loads that value into counter 202, to thereby synchronize the respective devices 22 and 24.

Because the LdTsExt pulse passes through synchronizer 316 and the output from AND gate 310 passes through flip flop 312 before updating the counters 202 in the slave devices 24, the slave devices 24 may be one or two clock cycles behind the master device 22 once their counters 202 are updated. Thus, in one embodiment, the value transmitted to the TGCCompReg register 302 is deliberately selected to be one or two cycles behind the value transmitted to the TSLoadVal registers 304 of each slave device 24. In this manner, by the time the counters in the slave devices 24 have been updated, the time stamp of the master device 22 will have advanced one or two cycles, and the devices 22 and 24 will be synchronized.

In another embodiment, the registers 302 and 304 are combined into a single register, used for both comparison purposes in the master device 22 and for holding the future time stamp value and updating the counter 202 in the respective slave devices 24. In that embodiment, the output from AND gate 310 in master device 22 serves as the LdTsExt pulse signal, and is connected directly to the respective registers in the slave devices 24 to immediately cause the counters 202 in the slave devices 24 to be updated to the new time stamp value.

Referring now to FIG. 8, there is shown the timing relationships and clock domain properties for the loading, transfer, and verification of TGC values. In the illustrative embodiment shown, the TGC clock runs at 20.48 MHz, while the system clock Sys_Clk is at 100 MHz.

Still referring to FIG. 8, when a time-stamped message is to be sent downstream to the cable modems 12, a TSSync pulse is generated on a byte number that is a predetermined number of bytes prior to the location of the actual time stamp. The TSSync pulse is synchronized by edge detection into the 20.48 MHz domain. The resulting TSLatch pulse serves to capture the current TGC value and has that value available in TSRegister 308 a predetermined amount of time before it is needed for insertion into the downstream time-stamped message.

The TSLatch pulse triggers MUX 210, such that the next rising edge of the clock causes the value of TSRegister 308 to be updated with the then-current value of counter 202. The value of TSRegister 308 then remains fixed until the next TSLatch pulse is received by MUX 210.

This invention is used in a CMTS device disclosed in an application entitled "Method and Apparatus for the Reduction of Upstream Request Processing Latency in a Cable Modem Termination System" Ser. No. 60/151,665, filed on even date herewith by Lisa Denney, Angers Hebsgaard, and Robert J. Lee, the disclosure of which is incorporated fully herein by reference.

From the foregoing, it will be apparent to those skilled in the art that the present invention provides a system and method for maintaining synchronization between multiple CMTS devices. In addition, the invention allows for the sharing of MAP information between the multiple CMTS devices.

While the above description contains many specific features of the invention, these should not be construed as limitations on the scope of the invention, but rather as exemplary embodiments thereof. Many other variations are possible. Accordingly, the scope of the invention should be determined not by the embodiments illustrated, but by the appended claims and their legal equivalents.

What is claimed is:

1. A communication system, comprising:
    a master cable modem termination system device having a first counter; and
    a first slave cable modem termination system device having a second counter;
    wherein the first slave cable modem termination system device sets the second counter based on a signal provided by the master cable modem termination system device; and
    wherein the second counter is used to generate timing information for transmission by the first slave cable modem termination system device.

2. The communication system of claim 1, wherein the first slave cable modem termination system device synchronizes the second counter with the first counter based on the signal.

3. The communication system of claim 1, wherein the master cable modem termination system device provides the signal in response to a value of the first counter corresponding to predetermined time stamp information.

4. The communication system of claim 1, further comprising:
    a second slave cable modem termination system device having a third counter;
    wherein the second slave cable modem termination system device sets the third counter based on the signal provided by the master cable modem termination system device.

5. The communication system of claim 4, wherein the master cable modem termination system device and the first and second slave cable modem termination system devices are connected via a synchronization bus.

6. The communication system of claim 1, wherein the master cable modem termination system device generates the signal based on time stamp information received from a processor.

7. The communication system of claim 6, wherein the processor updates the time stamp information in response to a lapse of a predetermined amount of time.

8. A communication system, comprising:
    a first cable modem termination system device to transmit MAP information to a plurality of cable modems, the MAP information including identifiers associated with respective upstream channels that are connected to the cable modems; and
    a second cable modem termination system device connected to an upstream channel, wherein the second cable modem termination system device filters the MAP information based on an identifier of the MAP information that is associated with the upstream channel that is connected to the second cable modem termination system device.

9. The communication system of claim 8, wherein the second cable modem termination system device stores a portion of the MAP information that is associated with the upstream channel that is connected to the second cable modem termination system device.

10. The communication system of claim 8, wherein the second cable modem termination system device disregards a portion of the MAP information that is not associated with the upstream channel that is connected to the second cable modem termination system device.

11. The communication system of claim 8, wherein the first cable modem termination system device transmits the MAP information to the second cable modem termination system device.

12. A method, comprising:
    storing time stamp information at a first slave cable modem termination system device having a first counter;
    setting the first counter of the first slave cable modem termination system device based on a signal provided by a master cable modem termination system device having a second counter; and
    generating timing information for transmission by the first slave cable modem termination system device using the first counter.

13. The method of claim 12, wherein setting the first counter includes synchronizing the first counter with the second counter based on the signal.

14. The method of claim 12, wherein storing the time stamp information includes storing the time stamp information associated with a future time stamp.

15. The method of claim 12, wherein setting the first counter is performed in response to detecting a time stamp value at the second counter that corresponds to the time stamp information.

16. The method of claim 12, further comprising:
    setting a third counter of a second slave cable modem termination system device based on the signal provided by the master cable modem termination system device.

17. The method of claim 16, further comprising:
    connecting the master cable modem termination system device and the first and second slave cable modem termination system devices via a synchronization bus.

18. The method of claim 12, further comprising:
    updating the time stamp information in response to a lapse of a predetermined amount of time.

19. A method, comprising:

transmitting MAP information including identifiers associated with respective upstream channels from a first cable modem termination system device to cable modems connected to the upstream channels; and filtering the MAP information at a second cable modem termination system device based on an identifier of the MAP information that corresponds with an upstream channel that is connected to the second cable modem termination system device.

20. The method of claim 19, further comprising:

storing a portion of the MAP information that corresponds with the upstream channel that is connected to the second cable modem termination system device at the second cable modem termination system device.

21. The method of claim 19, further comprising:

disregarding a portion of the MAP information that does not correspond with the upstream channel that is connected to the second cable modem termination system device at the second cable modem termination system device.

22. The method of claim 19, further comprising:

transmitting the MAP information from the first cable modem termination system device to the second cable modem termination system device, wherein filtering the MAP information at the second cable modem termination system device is performed in response to transmitting the MAP information from the first cable modem termination system device to the second cable modem termination system device.

* * * * *